United States Patent
Znosko

(10) Patent No.: US 7,930,436 B1
(45) Date of Patent: Apr. 19, 2011

(54) SYSTEM AND METHOD FOR DYNAMICALLY ADJUSTING DATA COMPRESSION PARAMETERS

(76) Inventor: Dmitry Y. Znosko, Moscow (RU)

( * ) Notice: Subject to any disclaimer, the term of this patent is extended or adjusted under 35 U.S.C. 154(b) by 298 days.

(21) Appl. No.: 12/400,102

(22) Filed: Mar. 9, 2009

(51) Int. Cl.
 G06F 15/16 (2006.01)
 G06F 15/173 (2006.01)
 G06F 15/177 (2006.01)
(52) U.S. Cl. ......... 709/247; 330/252; 717/126; 370/477
(58) Field of Classification Search .......... 709/245–250, 709/217–228; 370/477; 717/128; 330/252
 See application file for complete search history.

(56) References Cited

U.S. PATENT DOCUMENTS

| | | | | |
|---|---|---|---|---|
| 5,546,395 | A * | 8/1996 | Sharma et al. | 370/468 |
| 5,838,964 | A * | 11/1998 | Gubser | 370/468 |
| 7,069,544 | B1 * | 6/2006 | Thekkath | 717/128 |
| 7,420,992 | B1 * | 9/2008 | Fang et al. | 370/477 |
| 7,770,156 | B2 * | 8/2010 | Thekkath | 717/128 |
| 2006/0225050 | A1 * | 10/2006 | Thekkath | 717/128 |
| 2010/0301934 | A1 * | 12/2010 | Drogi et al. | 330/127 |
| 2010/0321109 | A1 * | 12/2010 | Drogi et al. | 330/135 |

* cited by examiner

Primary Examiner — Haresh N Patel
(74) Attorney, Agent, or Firm — Bardmesser Law Group

(57) ABSTRACT

The present invention relates generally to a system and a method for dynamically adjusting data compression parameters. The process of dynamic transfer of data parameters from the sender to the receiver has four steps: determining optimal compression parameters, compressing data that are on a sender side using the selected algorithm, transferring compressed data from the sender to the receiver and decompressing received data on the receiver's side. On the sender side, the transmitting computer stores multiple compression algorithms, and one of these algorithms is used to compress the data. A monitoring agent monitors the available processor resources, data type, and network conditions. The monitoring agent also determines when to dynamically adjust the level of compression and/or compression algorithm and sends a signal when it decides dynamically adjust the level of compression. A selector dynamically changes the compression algorithm.

11 Claims, 3 Drawing Sheets

SYSTEM AND METHOD FOR DYNAMICALLY ADJUSTING DATA COMPRESSION PARAMETERS

BACKGROUND OF THE INVENTION

1. Field of the Invention

The present invention relates generally to a system and a method for dynamically adjusting data compression parameters during transmission of data over a network.

2. Background Art

Communication networks are used to transfer information such as data, voice or video information, between communication devices such as packet telephones, computer terminals, multimedia workstations, and videophones, connected to the network. Data compression systems, which encode a digital data stream into compressed digital code signals, and which decode the compressed digital code signals back into the original data, are known in the art. The methods utilized in data compression systems serve to reduce the amount of storage space required to hold the digital information and/or result in a savings in the amount of time required to transmit a given amount of information.

Various methods and systems are known in the art for compressing and subsequently reconstituting, or decompressing data. For example, a compression scheme used widely on the Internet today is "gzip," designed by Jean-Loup Gailly. Gzip utilizes a variation of the well-known LZ77 (Lempel-Ziv 1977) compression technique, which replaces duplicated strings of bytes within a frame of a pre-defined distance with a pointer to the original string. Gzip also uses Huffman coding on the block of bytes and stores the Huffman code tree with the compressed data block. Gzip normally achieves a compression ratio of about 2:1 or 3:1, the compression ratio being the size of the uncompressed text relative to the size of the compressed text. The zlib library permits compression using the "deflate" method that is also used in the gzip algorithm.

While conventional systems effectively select an appropriate initial compression algorithm for a given media type to produce satisfactory compression, conventional communication systems do not dynamically adjust the compression scheme for a given connection based an entire range of possible factors that can affect selection of an optimum compression scheme. As is apparent from the above-described deficiencies with conventional communication systems, a need exists for a communication system that permits the compression, transferring and decompression scheme to be dynamically adjusted in response to processing power of processors, server resources, speed of data compression, type of data being transmitted and real-time network conditions. The examples of the network conditions are noise or congestion on the line.

SUMMARY OF THE INVENTION

The present invention relates generally to a system and a method for dynamically adjusting data compression parameters. The process of dynamic compression and transfer of data from the sender to the receiver has four steps: determining optimal compression parameters, compressing data that are on a sender side using the selected algorithm, transferring compressed data from the sender to the receiver and decompressing received data on the receiver's side.

A database on the sender side stores multiple compression algorithms, and one of these algorithms is used to compress specific data. These algorithms are changed dynamically by a selector anytime there is a need to change algorithm.

A monitoring agent monitors available processor resources, characteristics of the data being sent and the network conditions. Any time the available processor resources change or characteristics of the data being sent change or the network conditions change, the monitoring agent decides if it would be more efficient to change a compression algorithm. If the monitoring agent decides that it would be beneficial to change the compression algorithm, it sends a signal to a selector. In response, the selector dynamically changes an algorithm of data compression. The selector chooses the compression algorithm that will be the most efficient under the given circumstances.

The compressed data gets transferred via a communication channel to the receiver. The database on the receiver side stores multiple decompression algorithms, and one of these algorithms is used to decompress data. The decompression algorithm corresponds to the compression algorithm.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENT

Figure 1:
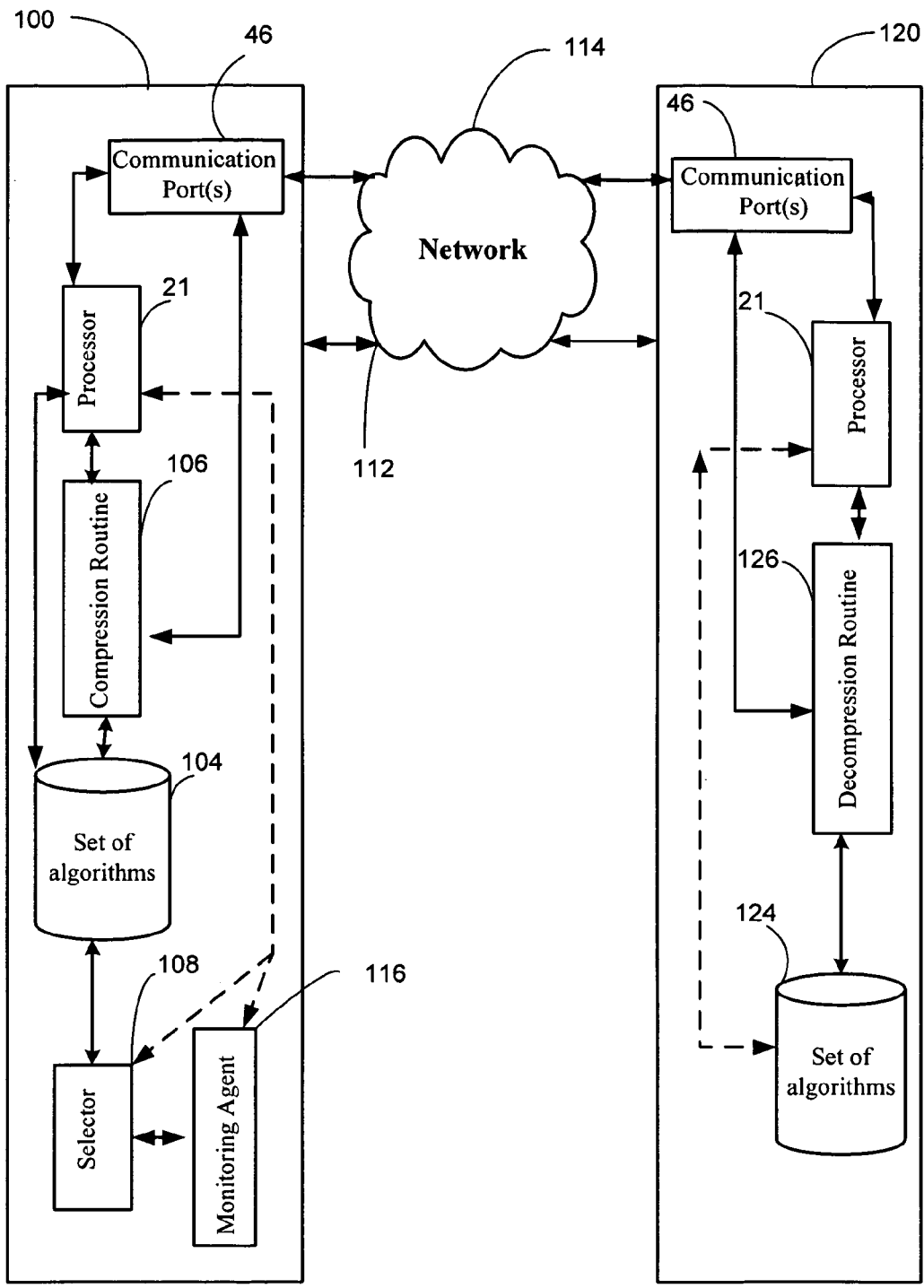
FIG. 1 illustrates a system for dynamic adjustments of data compression parameters in a most efficient way.

Reference will now be made in detail to the embodiment of the present invention, examples of which are illustrated in the accompanying drawings.

The present invention relates generally to a system and a method for dynamically adjusting data compression parameters, particularly for graphical data, such as virtual desktop images that need to be constantly updated. Such graphical images are usually very highly compressible, and the objective is to update the image seen by the client as quickly as possible, so that from the user's perspective, working on a virtual desktop is indistinguishable from working on a "real" one.

The process of dynamic compression and transfer of data from the sender to the receiver has four steps: determining optimal compression parameters, compressing data that are on a sender side using the selected algorithm, transferring compressed data from the sender to the receiver and decompressing received data on the receiver's side.

An optional database on the sender side stores multiple compression algorithms, and one of these algorithms is used to compress specific data. These algorithms are changed dynamically by a selector anytime there is a need to change algorithm. As an alternative, all the algorithms may be loaded into RAM, for immediate access.

A monitoring agent monitors available processor resources, characteristics of the data being sent and the network conditions. For example, the processor might be underutilized, or executing special instructions that essentially cycle the processor when there is "nothing to do", or the other tasks/threads executing at the moment do not require full CPU loading. Also, the processor can sometimes dynamically change its clock frequency due to low utilization or overheating. Note also that multiple processors may be available in the system (and utilized in the present invention), or additional math co-processors, etc.

Any time the available processor resources change or characteristics of the data (or data type, e.g., image data, 24 true color, 16 bit color, text, audio, voice, etc.) being sent change or the network conditions change, the monitoring agent decides if it would be more efficient to change a compression algorithm. If the monitoring agent decides that it would be beneficial to change the compression algorithm, it sends a signal to a selector. For example, there are any number of scenarios where the compression algorithm may be adjusted—either voluntarily, or in an enforced manner. For instance, the available bandwidth of the communication channel can change, either increasing or decreasing (e.g., when the receiver is connected to more than one sender, and is fully utilizing the capacity of the communication channel, while this particular sender, which was previously allocated the entire bandwidth, now only has a fraction of the available bandwidth. In this instance, if the sender is sending a video stream with a relatively low compression ratio, it may now be forced to compress the video to a much greater degree.

Another situation where the sender might change the compression algorithm is where the demand on the sender's processor resources is reduced, and several algorithms are available, each of which "works" in the given situation. However, from the user's perspective, the transfer of image data should be as "instantaneous" as possible (for example, when working with a virtual desktop, where the user moves a mouse, but the response to the action needs to come from the "desktop" on the server), it makes more sense to use higher compression whenever possible, to maximize the transfer speed whenever possible, and thereby minimize the action-response time, given the constraints of the communications channel.

In other situations, the processor on the receiver side might, at some point, start playing video from another source (e.g., a previously downloaded file), in which case, the demand on the processor resources for decompressing that file may be high, leaving little CPU capacity available for decompression of the incoming data. In that case, an algorithm that is relatively not computationally intensive may need to be used—but may be adjusted once the user finishes playing the other video, and the receiver's processor is free to devote more CPU time to the incoming data.

If it is determined that changing the compression algorithm or compression ratio is warranted, the selector dynamically changes an algorithm of data compression. The selector chooses the compression algorithm that will be the most efficient under the given circumstances. The sender and the receiver have to agree that it would be beneficial to both sides to select a different compression algorithm. Both sides also have to agree on a particular compression algorithm. As an alternative, the two sides can agree beforehand on what the receiver's capabilities are (in terms of hardware resources, supported algorithms, etc.), and the sender makes the decision as to which algorithm to use, and the receiver has to accept the choice.

In instances when, for example, several receivers are talking to a single sender, the sender processor available resources are low, the outgoing data may require less compression to reduce the demand on the processor resources than in the case of one sender and one receiver. Very often the incoming data varies in terms of contents (video embedded in the desktop image, text, etc.), which requires a selection of different compression algorithms. For example, graphical data requires decompression, which decreases the processor resources and usually requires a different compression/decompression algorithm than a text-type data. The compression algorithm could have higher or lower compression rate depending on the type of the outgoing data and the available processor resources. At other times the data does not have to be compressed to be transferred from the sender to the receiver. In these instances, when a channel of communication can support the data load without the compression or when the demand on the processors' resources is high, the data can be transferred without the compression. Data that is already compressed is generally not easily compressed any further.

The compressed data get transferred via communication channels to the receiver. The database on the receiver side stores multiple decompression algorithms, and one of these algorithms is used to decompress data. The decompression algorithm is corresponds to the compression algorithm.

FIG. 1 illustrates a system for dynamic adjustments of data compression parameters in a most efficient way. The sender 100 has a set of algorithms 104 that includes multiple compression algorithms. The processor 21 is interfaces to the set of algorithms 104 and performs the compression using a selected compression algorithm. The sender 100 also contains a compression routine 106 that compresses the data that later gets transferred via a communication channel 46 to the receiver 120. The monitoring agent 116 monitors the available processor resources, characteristics of the incoming data and the network conditions such as a noise on the line and determines when to dynamically adjust the level of compression and/or the compression algorithm. When it is efficient to change the compression algorithm, the monitoring agent 116 sends a signal to a selector 108 notifying the selector 108 that a new (or different) algorithm has to be selected. Upon receipt of the signal from the monitoring agent 108, the selector 108 picks the compression algorithm that is the most efficient under the given circumstances. Thus, the algorithms for compression are changed dynamically depending on specific data characteristics, available processor resources and network conditions.

The communication port 46 connects the sender 100 to the network 114 via a communication channel 112. The compressed data gets transferred from the communication port 46 of the sender 100 to the receiver 120 via a communication channel 112.

The communication port 46 of the receiver side 120 receives the compressed data parameters. The compressed data parameters are sent to the processor 21. Later, decompression routine 126 chooses a proper decompression algorithm stored in the set of algorithms 124 to decompressed received data.

As with any communication, compressed data communication only works when both the sender 100 and the receiver 120 understand the encoding/compression scheme. For example, the text data compression makes sense only if the receiver understands that it is intended to be interpreted as characters representing the English language or any other languages. Similarly, compressed data can only be understood if the decompression method is known to the receiver. Therefore, the algorithm used to compress the data should correspond to the algorithm to decompress it. The goal is to restore received data into original data.

The conventional scenario is when the sender is a server and the receiver is a client. However, the client could also be a sender and the server could be a receiver. Two computers could also send information to each other, where neither is a server or client.

The goal of this system implementation is when selection of the compression algorithm, and the total time of compression, transfer and decompression of data produce the most efficient results (i.e., $T_{total}$ is minimized):

$$T_{total} = T_{comp} + T_{trans} + T_{decomp}, \text{ where}$$

$$T_{comp} = F_c(\text{Algorithm, Sender Processing power, Data characteristics})$$

$$T_{trans} = 1/V_{chan} C(\text{Algorithm, Data characteristics})$$

$$T_{decomp} = F_d(\text{Algorithm, Receiver Processing power, Data characteristics})$$

Time to compress the data ($T_{comp}$) is a function of the compression algorithm, processing power of the sender computer and data type/characteristics. Time to compress the data also depends on the available processor resources. The same compression algorithm could produce different results depending on degree of compression of specific data and the available processor resources.

Time to transfer the compressed data ($T_{trans}$) is inversely related to the speed $V_{chan}$ of the communication channel 112 (essentially, $1/V_{chan}$ is a normalized time to transmit one byte, and, correspondingly, the other times in the equations, $T_{comp}$ and $T_{decomp}$ are normalized times). Time to transfer the compressed data depends on compression ratio C (essentially, a compression ratio) that is a function of algorithm of compression and the data characteristics. The speed of communication channel $V_{chan}$ depends on the speed of the network 114, the load on the local router and cable modems.

Time to decompress the transferred compressed data ($T_{decomp}$) is a function of the decompression algorithm, processing power of the receiver computer and the available processor resources and data characteristics.

Frequently, specific data benefits more from one compression algorithm than from another. For example, one of the many compression algorithms that can be used by the compression routine 106 to compress data is Zlib algorithm. Zlib is an efficient algorithm for text-based data that learns and improves over time as it stores common text strings for repeated use. (The PNG format relies on Zlib.) This algorithm is slower and more processor-intensive than, for example, Pred2 algorithm, but yields the best compression for text. This algorithm has 9 levels, Zlib1 through Zlib9. Level 1 is very fast but compresses only modestly. Levels 7 to 9 yield the highest degree of compression. Level 7 (Zlib7) typically offers the best compromise of compression and speed.

Another example of compression algorithm used by the compression routine 106 to compress the data is BZip2 algorithm. BZip2 compression algorithm compresses most files more effectively than, for example, the more traditional GZIP or ZIP algorithm, but is slower. In this sense, it is fairly similar to other recent-generation compression algorithms. Another example of compression algorithm used by the compressor is LZ0.

Figure 2:
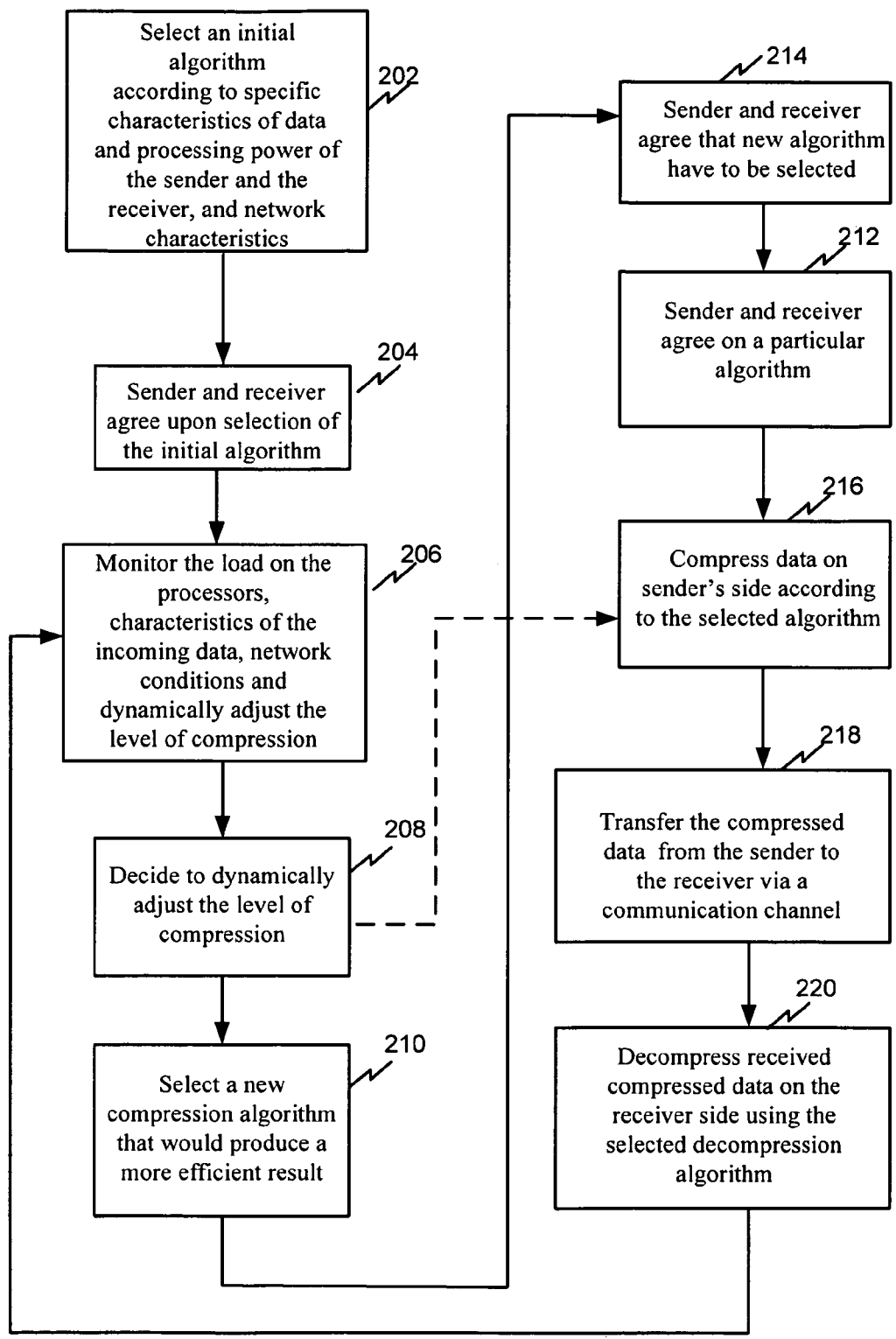
FIG. 2 illustrates a flow chart of a method of dynamic adjustments of data compression parameters in a most efficient way.

FIG. 2 illustrates a flow chart of a method of dynamic adjustments of data compression parameters in a most efficient way. The method starts with selecting an initial compression algorithm according to specific characteristics of data, processing power of the sender and the receiver, and speed of a communication channel $V_{chan}$ (step 202). The method further continues when both the sender and the receiver agreed on selection of the compression algorithm, from a list of compression algorithms supported by both sender and receiver. This step can be part of the initial hand shaking between the sender and the receiver (step 204).

The method continues with monitoring the available processor resources, characteristics of the outgoing data, the network conditions, and dynamically adjusting the level of compression and/or compression algorithm (step 206). The method continues with deciding to dynamically adjust the level of compression (step 208). If no adjustment is needed, then the algorithm proceeds to step 216. Otherwise, the method continues with selecting a new compression algorithm that produces the most efficient results (step 210). The sender and the receiver have to agree that a new compression algorithm have to be selected (step 212). Both sides also have to agree on a particular algorithm (step 214). The next step in the method is to compress the data on the sender side according to the selected compression algorithm (step 216).

The next step in the method is to transfer previously compressed data from the sender to the receiver via a communication channel (step 218), such as the Internet or an Intranet. The next step is decompressing the transferred compressed data on the receiver computer using the selected decompression algorithm (step 220).

This process continues using the selected compression algorithm from until the monitoring agent 116 detects certain changes and decides that the compression algorithm had to be changed again. The next selected compression algorithm could have higher or lower compression rate.

Figure 3:
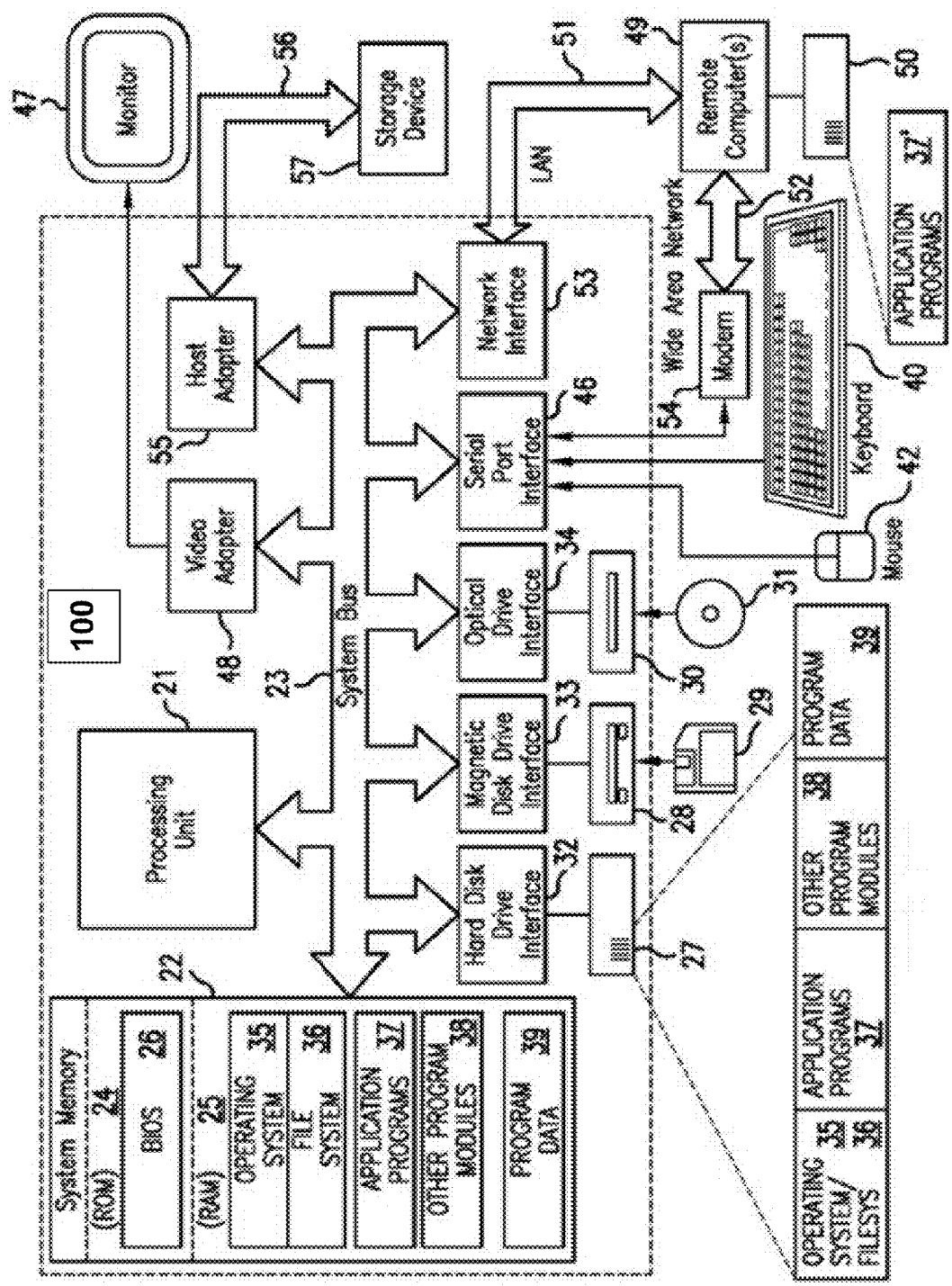
FIG. 3 illustrates an example of a computer system used for implementation of a proposed method.

With reference to FIG. 3, an exemplary system for implementing the invention includes a general purpose computing device in the form of a computer or server 100 or 120 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any variety of bus architectures. The system memory includes read-only memory (ROM) 24 and random access memory (RAM) 25. A basic input/output system 26 (BIOS), containing the basic routines that help to transfer information between elements within the computer 100 or 120, such as during start-up, is stored in ROM 24.

The computer 100 or 120 may further include a hard disk drive 27 for reading from and writing to a hard disk, not shown in the figure, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide a non-volatile storage of computer readable instructions, data structures, program modules/subroutines, such that may be used to implement the steps of the method described herein, and other data for the computer 100 or 120. Although the exemplary environment described herein employs a hard disk, a removable magnetic disk 29 and a removable optical disk 31, it should be appreciated by those skilled in the art that other types of computer readable media that can store data accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (e.g., Windows™ 2000). The computer 100 or 120 includes a file system 36 associated with or included within the operating system 35, such as the Windows NT™ File System (NTFS), one or more application programs 37, other program modules 38 and program data 39.

A user may enter commands and information into the computer 100 or 120 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, computers typically include other peripheral output devices, such as speakers and printers.

The computer 100 or 120 may operate in a networked environment using logical connections to one or more remote computers 49. The remote computer (or computers) 49 may be represented by a personal computer, a server, a router, a network PC, a peer device or other common network node, and it normally includes many or all of the elements described above relative to the computer 100 or 120, although only a memory storage device 50 is illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 100 or 120 is connected to the local network 51 through a network interface or adapter 53. When used in a WAN networking environment, the computer 100 or 120 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 100 or 120, or portions thereof, may be stored in the remote memory storage device. It will be appreciated that the network connections shown are exemplary and other means of establishing a communications link between the computers may be used. Such computers as described above can be used in conventional networks, e.g., the Internet, intranets, local area networks, regional networks, wide area networks, land-line and wireless networks, and so forth. These networks can link various resources, such as user computers, servers, Internet service providers, telephones connected to the network, palmtop computers, smartphones, and so on, all of which can be used to implement the present invention.

Having thus described a preferred embodiment, it should be apparent to those skilled in the art that certain advantages of the described method and system have been achieved. It should be appreciated by those skilled in the art that the process of dynamic transfer of data from the sender to the receiver is achieved by dynamically adjusting the level of compression and decompression for a specific data and planned to optimize total transfer time. It should also be appreciated that various modifications, adaptations, and alternative embodiments thereof may be made within the scope and spirit of the present invention. The invention is further defined by the following claims.

What is claimed is:

1. A computer-implemented method for dynamically adjusting data compression parameters, the method comprising:
    selecting an initial algorithm based on data type, processing power of a sender processor and processing power of a receiver processor, and speed of a communication channel between the sender and the receiver;
    monitoring available processor resources on the sender and receiver sides, changes in data type and changes in network conditions;
    based on the available processor resources, data type and network conditions, continuously determining when to dynamically adjust at least one of a level of compression and compression algorithm;
    selecting a different compression algorithm based on a desired coefficient of compression;
    compressing the data using the different compression algorithm;
    transferring compressed data from the sender to the receiver via the communication channel; and
    decompressing the transferred data on the receiver using a different decompression algorithm that corresponds to the different compression algorithm.

2. The method of claim 1, wherein different data types result in a selection of different compression algorithms.

3. The method of claim 2, wherein the data type is any graphical images, video, text and encrypted data.

4. The method of claim 1, wherein the method optimizes total transmission time based on the following:
    time to compress the data;
    time to transfer the data; and
    time to decompress the data.

5. The method of claim 4, wherein the time to compress the data depends on the compression algorithm, processing power of the sender and data type.

6. The method of claim 4, wherein the time to transfer the compressed data depends on degree of compression of the data using the chosen algorithm and speed of the communication channel.

7. The method of claim 4, wherein the time to decompress the data depends on the decompression algorithm, processing power of the receiver and data type.

8. The method of claim 1, wherein the communication channel is the Internet.

9. The method of claim 1, wherein the communication channel is an Intranet.

10. A non-transitory computer useable storage medium having computer executable program logic stored thereon for executing on a processor, the program logic implementing the steps of claim 1.

11. A system for dynamically adjusting data compression parameters, the system comprising:
    a processor;
    a memory; and
    a computer code loaded into the memory and executed on the processor for implementing the steps of claim 1.

* * * * *